United States Patent [19]

Peled et al.

[11] 4,410,609

[45] Oct. 18, 1983

[54] ELECTROCHEMICAL CELL

[76] Inventors: Emanuel Peled, Hanotea St., Even Yehuda (a Settlement); Hertzel Yamin, 12 Habitachon St., Kiron, both of Israel

[21] Appl. No.: 303,020

[22] Filed: Sep. 17, 1981

[30] Foreign Application Priority Data

Sep. 19, 1980 [IL] Israel ........................................ 61085

[51] Int. Cl.³ .............................................. H01M 6/16
[52] U.S. Cl. .................................... 429/105; 429/196
[58] Field of Search ............... 429/105, 101, 191, 194, 429/196

[56] References Cited

U.S. PATENT DOCUMENTS

| | | | |
|---|---|---|---|
| 3,907,591 | 9/1975 | Lauck | 429/194 |
| 3,915,743 | 10/1975 | Lauck | 429/194 |
| 4,018,969 | 4/1977 | Fischer | 429/191 |
| 4,238,553 | 12/1980 | Weddigen | 429/191 |

*Primary Examiner*—Donald L. Walton
*Attorney, Agent, or Firm*—Fleit, Jacobson, Cohn & Price

[57] ABSTRACT

There is provided a novel primary cell which comprises in combination an anode made of lithium, of sodium or of a dischargeable alloy of same, which has a melting point above 80° C., an electrolyte comprising a solvent or solvent mixture which is suited to dissolve a polysulfide to attain a concentration of at least 0.01 M, and to dissolve an electrolyte salt to give a solution of at least 0.1 M, said solvent or solvent system having an own EMF against the anode which is low enough so as not to prevent the reaction of the anode material with said polysulfide to form a $M_2S$ solid electrolyte interphase, said electrolyte containing a polysulfide $M_2S_n$ where M is selected from lithium and sodium, the concentration of the polysulfide being high enough and n being low enough to result in a predetermined low selfdischarge of the cell, and an inert porous current collector. The current collector may be charged with sulfur. The solvent system may contain a solvent which reduces the solubility of the polysulfide, thus increasing the conductivity of the electrolyte.

19 Claims, 2 Drawing Figures

ELECTROCHEMICAL CELL

FIELD OF THE INVENTION

The present invention relates to a primary electrochemical cell of high energy density which has a long shelf life and a very low self-discharge rate.

The novel cell is based on an anode made of lithium, sodium or a dischargeable alloy of same; on an inert porous current collector and on a solvent system wherein there are dissolved a polysulfide and an electrolyte. The current collector may be charged with sulfur. Advantageously the solvent system contains a solvent which results in a limited dissolution of the polysulfide in said solvent system.

BACKGROUND OF THE INVENTION

The lithium-sulfur couple has one of the highest theoretical energy densities, which is about 2500 Whr $Kg^{-1}$. However, when lithium is immersed in a saturated solution of sulfur in tetrahydrofuran (THF) it undergoes corrosion at a rapid rate, due to the reduction of the sulfur. A corrosion rate in excess of 100 mA $cm^2$ was measured and thus it is evident that this system cannot constitute a practical electrochemical cell. It was reported by Kock & Young, Electrochemical Society Fall Meeting, Atlanta, Ga. (1977) that lithium reacts with THF giving butanol and a mixture of aldehydes.

U.S. Pat. No. 3,532,543 1970 (D. A. Nole and V. Moss) claims a cell having a Li-anode, a solvent selected from ethylene carbonate, propylene carbonate, gamma butyrolactone and dimethoxyethane, or mixtures thereof, and a solute comprising a soluble lithium salt, said electrolyte being initially prepared by dispersing $CS_2$ and finely divided lithium powder in the solvent of the electrolyte and permitting the resultant mixture to undergo reaction, and sulfur containing cathode. There are described cells in which the solvent is a mixture of ether and alkyl carbonate. These cells have an OCV of 2.8 V. This OCV is much higher than 2.4 V which is the theoretical OCV of the Li/S couple. In these cells the ethyl carbonates (or the gamma butyrolactone) serve as soluble cathodes, thus giving the higher OCV. In addition, we have found that the addition of propylene carbonate to Li/S cells having THF as solvent, markedly reduces the utilization of the sulfur (Example 18).

H. Lauck, U.S. Pat. No. 3,915,743, (1975), claims a cell with a lithium anode (or Ca,Mg Al) and a positive sulfur electrode and electrolyte comprising a conductive salt and an organic solvent which contains $BF_3$ and alkyl carbonate and glycol ether. The OCV of these cells was 2.8-3.0, indicating the oxidation of lithium by the alkyl carbonate. The $BF_3$ was "necessary to prevent the formation of polysulfides during discharge". H. Lauck, U.S. Pat. No. 3,907,591, (1975), claims a cell having a negative electrode formed of light metal and an electrolyte containing a conductive salt in organic solvent, a positive sulfur electrode formed of amorphous, insoluble sulfur having an additive of conductive material. In his examples he used bortrihalogenide which "prevents formation of polysulfides during the discharging process and considerably increases the current output". The main claim is very general and problematic. For example, the "light metals", Al, Mg, Ca are not practically dischargeable in many organic solvents such as alkyl carbonates, DMSO, DMSU, and lithium will completely disintegrate within a few days in a solution of $LiAlCl_4$ in ethers.

Dey, U.S. Pat. No. 3,806,369 claims a cell with a light metal anode, sulfur cathode and cation exchange membrane which separates the anode and the cathode. The purpose of the membrane was "to inhibit the migration of polysulfides from the cathode to the anode".

SUMMARY OF THE INVENTION

BRIEF DESCRIPTIONS OF THE DRAWINGS

According to the present invention there is provided a novel electrochemical cell based on the lithium-sulfur or on the sodium-sulfur couple. The cell comprises a specific solvent system containing dissolved polysulfide which serves as soluble cathode. There is advantageously provided also an electrolyte salt. The solvent and the electrolyte salt should have a lower EMF against the anode than the anode-sulfur couple. The present invention essentially relates to a novel primary electrochemical cell which comprises in combination an anode made of lithium, of sodium or of a dischargeable alloy of same, which has a melting point above 80° C., an electrolyte comprising a solvent or solvent mixture which is suited to dissolve a polysulfide to attain a concentration of at least 0.01 M, and to dissolve an electrolyte salt to give a solution of at least 0.1 M, said solvent or solvent system having an own EMF against the anode which is low enough so as not to prevent the reaction of the anode material with said polysulfide to form a $M_2S$ solid electrolyte interphase, said electrolyte containing a polysulfide $M_2S_n$ where M is selected from lithium and sodium, the concentration of the polysulfide being high enough and n being low enough to result in a predetermined low selfdischarge of the cell, and an inert porous current collector. The current collector may be charged with sulfur. The solvent system may contain a solvent which reduces the solubility of the polysulfide, thus increasing the conductivity of the electrolyte.

The present invention relates to a primary high-energy-density low-rate cell, comprising a lithium (or sodium) anode (possibly comprising solid sulfur charged on the porous cathodic current collector), a suitable solvent, preferably from ethers (or a mixture of ethers) and alkyl benzene or polyalkyl benzene having a b.p. above 60° C. and a m.p. below 0° C. a soluble polysulfide, optionally an electrolyte salt compatible with the anode and the polysulfide and a porous cathodic current collector made from high surface area carbon or graphite bonded by an inert binder such as Teflon. This cell has a long shelf life and a very low self discharge rate.

Figure 1:
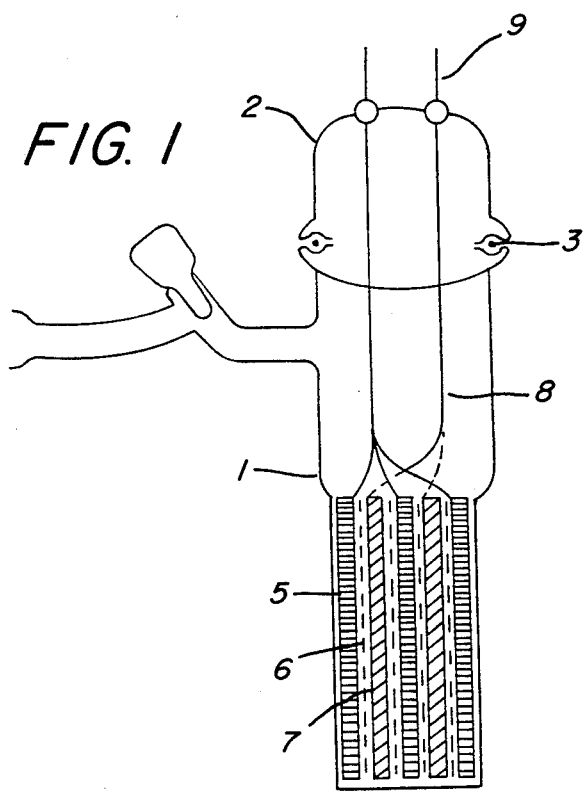
FIG. 1 is a cut-away side view of the experimental cell of the invention.

The experimental cell 1 shown in FIG. 1, comprises a cap 2 made of glass in two parts, between which are arranged O-rings 3, a rotaflow valve 4, three lithium anodes 5 and two carbon cathodes charged with sulphur 7. Between the anodes 5 and the cathodes 7 are located polypropylene separators 6. The anodes 5 and the cathodes 7 are connected via nickel bands 8 to the tungsten wire outlet 9. The lower part of the cell is contained in a steel housing, and the performance of the cell is illustrated below in Example 1.

Figure 2:
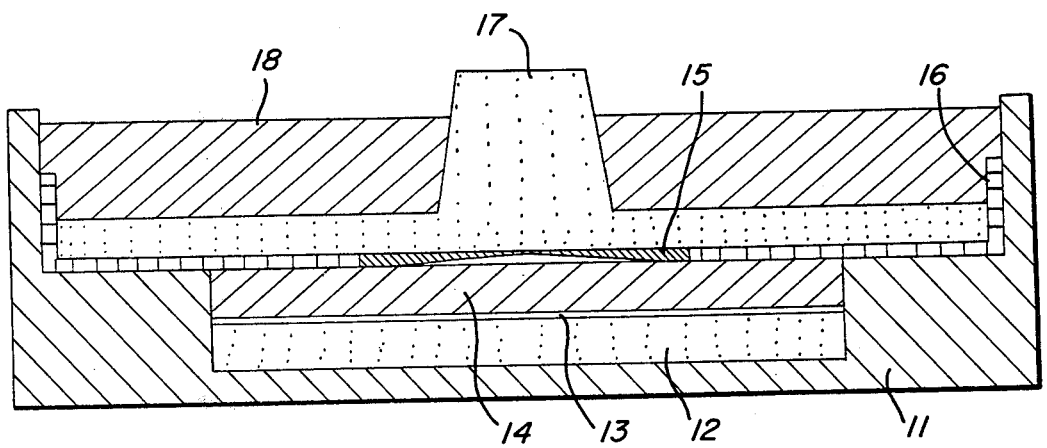
FIG. 2 is a cross-sectional view of a button-type cell.

FIG. 2 describes a button-type cell. This cell comprises a cell case 11, preferably made of stainless steel, a lithium anode 12, a glass separator 13, a carbon cathode 14, a current collector 15, a polypropylene seal 16, a cell cover 17, and a torr seal cement 18. The performance of the cell is illustrated below in Example 7.

According to the invention it has been found that under certain conditions, the corrosion of lithium (or sodium) due to the reaction with the solvent or with sulfur can be reduced to such a low level that it becomes possible to construct lithium-sulfur or sodium-sulfur cells. This is attained by creating such conditions that the reduction product of the anode and the sulfur (i.e. lithium sulfide) will be insoluble in the electrolyte and will precipitate on the anode to form an adherent film which has the properties of a solid electrolyte. This solid electrolyte interphase (SEI) separates between the anode and the soluble cathode and slows down the further corrosion of the anode. The SEI should be a good insulator for electrons, but it ought to be selectively permeable to the cations of the metal of the anode (i.e. $t_{M^+} = 1$, $t_e = 0$, $t_x - = 0$). Lithium sulfide is not soluble in THF, but is soluble in a solution of sulfur in THF, or in an ethereal solution of long chain polysulfides. As the chain of these becomes shorter the $Li_2S$ solubility decreases and solubility becomes slower. The corrosion rate of lithium in a THF-polysulfide solution decreases as the polysulfide chain becomes shorter and its concentration is increased. At 0.8 M $Li_2S_9$, the corrosion rate is about 30 mA cm$^{-2}$, at 0.9 M $Li_2S_{7.6}$ the corrosion rate is 30 $\mu$A cm$^{-2}$ and at 1.2 M $Li_2S_6$ the corrosion rate, over a period of one year, is smaller than 0.5 uA cm$^{-2}$. Thus it is possible to control the corrosion rate of the lithium anode to the desired level by changing the concentration and the length of the polysulfide. In order to reduce the corrosion rate and to improve the shelf life of the cell it is desirable to increase the concentration of the polysulfide up to saturation and/or to use a short enough polysulfide.

A typical cell contains 140-250 mA hr cm$^{-2}$ of anode; therefore a self discharge rate of 0.5 uA cm$^{-2}$ is equivalent to an energy loss of about 2–3% per year, or a shelf life of more than 6 years (to 80% of initial capacity) at room temperature.

The cell reactions are:

anode: Li 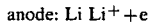 Li$^+$ + e    (1)

cathode: $S_n^{-2}$ + 2e 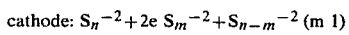 $S_m^{-2}$ + $S_{n-m}^{-2}$ (m 1)    (2)

or $S_n^{-2}$ + 2e + 2Li$^+$  $S_{n-1}^{-2}$ + Li$_2$S    (3)

It seems that as n becomes smaller, reaction (3) dominates while for n 9 reaction (2) is predominant. The OCV of the cell containing THF as the solvent depends on the value of n and on the concentration of the polysulfide. When solid sulfur is present on the cathode, the OCV is 2.45 V. At 0.9 Li$_2$S$_8$ the OCV is 2.35. During the discharge of the cell the OCV decreases and remains constant ~2.15 V up to about 60% of the utilization of the sulfur. At 70%, utilization of the OCV is 2.12 V. In order to increase the conductivity of the electrolyte, inorganic salts can be added. These should be compatible with both the anode and the polysulfide. These salts preferably contain the cation of the anode and an anion selected from bromide, iodide and perchlorate. It is obvious that all components of the cell should be carefully dried. The cathodic current collector is made from a high surface area powder of carbon or graphite bonded with an inert binder such as tetrafluoropolyethylene (Teflon) and supported by an Exmet of nickel or stainless steel support. The porosity of the cathodic current collector is advantageously about 80%. (75%-90%). It is possible to load this current collector with solid sulfur by dipping it in a hot solution of sulfur (20–30 weight percent) in an aromatic hydrocarbon, such as ethyl benzene, toluene or mesitylene for a few minutes and then drying it at about 60° C. in a vacuum oven. Another way to load the current collector with sulfur is to blend a teflonated carbon powder with solid sulfur and to apply this mixture to a supporting nickel or stainless steel screen under pressure. The viscosity of a concentrated ether solution of a polysulfide is rather high and its electric conductivity is low. Therefore, such a cell can deliver low currents of the order of 10 uA cm$^{-2}$ to 1 mA cm$^{-2}$ depending on the conductivity of the solution. As the current density decreases, the sulfur utilization increases, and at 10 uA cm$^{-2}$ a utilization of more than 95% was achieved. The solvent is preferably selected from the following ethers (or a mixture of them): THF, 2MTHF, Dioxolane, Glyme (Ethyleneglycol dimethylether), Diglyme (Diethyleneglycol Dimethylether and triglyme (Triethyleneglycol Dimethylether).

It is possible to increase the conductivity of the etheral solution by adding a cosolvent which decreases the solubility of the polysulfide and therefore decreases the viscosity of the electrolyte. The cosolvent is preferably selected from the following alkyl benzenes: benzene, toluene, xylene, mesitylene, ethylbenzene, ethylmethyl benzene.

The maximum volumetric energy density achieved to date at a low drain (with an unoptimized miniature cell) is 1.2 Wh cm$^{-3}$, based on the net volume of the cell's components excluding only the cell's case. It is estimated that taking into account the case of the cell, it will be possible to get an energy density of about 1 Wh cm$^{-3}$ for a miniature cell. The energy density of commercial miniature cells (volume of up to 5 cc) is as follows:

| System | Energy Density Wh cm$^{-3}$ |
|---|---|
| Li—SOCl$_2$ | 0.6 |
| Li—CF$_x$ | 0.3 |
| Li—I | 0.6 |
| Li—MnO$_2$ | 0.45 |

It is clear that the present invention provides a cell with the highest volumetric energy density. It seems to us that after optimalization, the energy density of a commercial miniature Li-S cell according to the present invention will be 1.2 Wh cm$^{-3}$ or even more.

DESCRIPTION OF THE PREFERRED EMBODIMENT

The invention is illustrated with reference to the following examples, which are illustrative only and which ought to be construed in a non-limitative manner.

EXAMPLES

EXAMPLE 1

FIG. 1 describes a glass laboratory cell, the lower part of which has a rectangular shape. The cell has an upper O-ring joint to which the cap was attached. The electrodes were connected to tungsten rods sealed in the cap. The cell was vacuum tight, sealing being accomplished with the use of a Viton O-ring. The outer part of the gap between the joints was further sealed with a Torr Seal. The internal volume of the cell was about 6 cm$^3$ (5.2×2.3×0.5 cm). The surface area of the electrode was 43.7 cm$^2$.

The polysulfide solution was prepared by the stirring of a known amount of Li with sulfur dissolved in THF for 50 hrs. The THF was previously dried by mixing it with LiAlH$_4$. The composition of the solution was 1.2 M Li$_2$S$_{7.5}$. To this solution vacuum dried LiBr was added to make a 1 M solution. The cell contains 3.0 ml of the above electrolyte. The cathodic current collector was Teflon-bonded carbon supported on Ni Exmet. It was charged with 1.6 gr of sulfur. A "Celegard" porous polypropylene separator was inserted between the electrodes. The total capacity of the cell was 4 A hr. The cell was discharged on an increasing load, starting with a current density of 1 mA cm$^{-2}$ and going down to 10 $\mu$A cm$^{-2}$. The initial OCV was 2.35 V. The cell ran for more than two months and gave more than 3 Ah to a cut-off voltage of 1.5 V (i.e. the utility of the sulfur was higher than 75%). The volumetric energy density of this cell (based on the internal volume of the cell) was 1.05 Wh cm$^{-3}$.

EXAMPLE 2

A cell similar to Example 1 was assembled. The electrode area was 18 cm$^2$. The internal cell volume was 3.65 cm$^3$ (0.37×1.9×5.2 cm). The total capacity of the cell was 2.6 A hr. The cell was discharged on increasing loads starting with a current density of 0.1 mA cm$^{-2}$ and ending with 10 $\mu$A cm$^{-2}$ after three months of continuous discharge. The cell delivered 2.1 Ah to a cutoff voltage of 1.5 V, which is a utilization of 80% of the sulfur. The volumetric energy density (on the basis of the internal volume of the cell) is 1.2 Wh cm$^{-3}$.

EXAMPLE 3

A cell similar to Example 2 was assembled. The glass vessel had the same dimensions. It included one anode (7.5 cm$^2$ in area), placed between two larger cathodes (1 mm on each side). A glass fiber separator was inserted between the electrodes. The electrolyte was 1.5 M Li$_2$S$_6$+1.0 M LiBr in THF. The cathodic current collector contained no solid sulfur. The OCV of the cell was 2.15 V. The cell discharged on increasing loads starting from a current density of 0.1 mA cm$^{-2}$. The total capacity to a cutoff voltage of 1.5 V, was 0.8 A hr after three months of continuous discharge.

EXAMPLE 4

A cell with a sodium anode, and Teflon-bonded carbon current collector having an area of 4 cm$^2$ was assembled. The cell was of the flooded type, i.e. it has an excess of electrolyte. The electrolyte was sodium polysulfide in THF. It was prepared by stirring sodium metal with sulfur dissolved in THF. The OCV of the cell was 1.99 V. The initial working potential on 4 k $\Omega$ load was 1.92 V. After 5 days of discharge the cell's potential was 1.3 V. The capacity to a cutoff voltage of 1.3 V was 10 mA hr cm$^{-2}$ (or a total capacity of 40 mA hr).

EXAMPLE 5

The cell was assembled as in Example 1. The cathodic current collector contained no solid sulfur. The cell contained 3.5 ml of electrolyte with the composition 1 M LiBr+3 M Li$_2$S$_7$ in THF. The total capacity of the cell was 3.4 Ah. The OCV of the cell was 2.35 V. The cell was discharged on increasing loads starting with a current density of 0.05 mA cm$^{-2}$, and ending with a current density of 5 $\mu$A cm$^{-2}$ after six months. The cell delivered 2.8 Ah to a cutoff voltage of 1.5 V.

EXAMPLE 6

1.2 M Li$_2$Si$_{7.5}$ THF solution was prepared as described in Example 1. The solution was stirred for 2 hours with solid sulfur to make a solution containing 13 molar S. When 1 molar LiClO$_4$ was added, the conductivity of the solution was 0.025 mMho cm$^{-1}$.

In order to decrease the solubility of polysulfide, toluene was added to 0.8 M Li$_2$S$_9$-THF solution to make a solution of 1:1 by volume toluene:THF. After 1 hour of stirring the solution with LiClO$_4$, the concentration was 1 M LiClO$_4$; solid sulfur and Li$_2$S were precipitated. The conductivity of the solution was 0.96 mMho cm$^{-1}$ at R.T. In the same manner, different solutions containing alkyl benzene were prepared. Their conductivities are summarized in Table 1.

EXAMPLE 7

FIG. 2 describes a button type cell. This cell comprises a cell case 11, preferably made of stainless steel, a lithium anode 12, a glass separator 13, a carbon cathode 14, a current collector 15, a polypropylene seal 16, a cell over 17, and a Torr seal cement 18. It is clear that this is a laboratory cell, as the "active volume" is small, and in actual production the overall size can be considerably reduced. The internal volume was 0.60 ml and the surface area of the electrodes was 2.54 cm$^2$. The solution was lithium polysulfide dissolved in 1:1 Toluene-THF prepared as had been described in Example 6, with 1 M LiClO$_4$. The cathodic current collector was Teflon-bonded carbon supported on Ni Exmet. It was charged with 0.13 g of sulfur. The total capacity of the cell was 260 mAh. The cell was discharged on increasing load, starting with current density of 0.36 mA/cm$^2$ and ending with 15 $\mu$A/cm$^2$. After 3 months, the cell delivered more than 240 mAh to a cut off voltage of 1.5 V (a utilization of sulfur higher than 90).

EXAMPLE 8

A cell similar to Example 7 was assembled. The electrolyte was lithium polysulfide dissolved in a mixture of 3:1 by volume of toluene and THF, +1 M LiClO$_4$. The cathodic current collector was charged with 0.145 g of sulfur. The total capacity of the cell was 260 mAh. The OCV of the cell was 2.21 volts. The cell was discharged on 10K $\Omega$ load for 2 months and delivered more than 90% of its capacity to a cut off voltage of 1.5 V.

EXAMPLE 9

A cell similar to Example 7 was assembled. The electrolyte was about 0.6 M Li$_2$S$_8$ dissolved in 2-M-THF+1 M LiClO$_4$ (prepared in a similar way as in Example 1). The cathodic current collector was charged with 115 mg of sulfur. The total capacity of the cell was 260 mAh. The initial OCV of the cell was 2.29 V. The cell was discharged on increasing loads starting with a current density of 85 $\mu$A/cm$^2$ and ending with 10 $\mu$A/cm$^2$. After 5 months of continuous discharge the cell delivered about 95% of it's capacity to a cut-off voltage of 1.5 Volt. The average working voltage of the cell was about 2 V.

EXAMPLE 10-15

Six button cells similar to Example 7 were assembled. Their internal volume was 0.72 ml, having a capacity of 500 mAh. The electrolytes were 1 M Li-perchlorate saturated with $Li_2S_9$ dissolved in a mixture of solvents. The properties and the performances of the cells are summarized in Table 2. The nominal volumetric energy density of these cells is about 1400 wh/liter.

EXAMPLE 16

A cell similar to Example 7 was assembled. The electrolyte was a mixture of 1:1 by volume of toluene: THF + 1 M $LiClO_4$ containing no polysulfide. The cathodic current collector was charged with 300 mg of sulfur. Polysulfides begin to form in situ immediately after adding the electrolyte by selfdischarge and by predischarge of the cell. The total capacity of the cell was 500 mAhr. The cell was discharged on increasing load starting with current density of 150 $\mu A/cm^2$ and going down to 40 $\mu A/cm^2$ after delivering 100 mAhr. The cell is still running at this rate at a voltage of about 2 V.

EXAMPLE 17

Ten cells similar to Example 11 were assembled. The cells were stored at 60° C. for 21 days. After this period 6 cells were disassembled and quantitatively analyzed for Li and $S^=$. A loss of 2-4% in Li and in S was found. The remaining cells were discharged at 22KΩ load. Up to date, the cells delivered more than 80 mAhr with working voltage of above 2.1 V. No voltage delay at this load was realized after the 21 days of storage at 60° C. The cells lost less than 1 mg during the storage at 60° C. for 21 days.

TABLE 1

The Conductivity of THF-alkyl Benzene Solutions saturated with $Li_2S$, S and Polysulfides.

| THF/Toluene volume ratio | THF/xylene volume ratio | THF/Mesitilene volume ratio | $LiClO_4$ (M) | Conductivity (mMho cm$^{-1}$) |
|---|---|---|---|---|
| 1:1 | — | — | 0.5 | 0.88 |
| 1:1 | — | — | 1 | 0.96 |
| — | 1:1 | — | 0.5 | 0.80 |
| — | 1:1 | — | 1 | 0.93 |
| — | — | 1:1 | 0.5 | 0.65 |
| — | — | 1:1 | 1 | 0.80 |
| 1:3 | — | — | 0.5 | 0.19 |
| 1:3 | — | — | 1 | 0.12 |

TABLE 2

Performance of Li/S Cells

| Example No. | Solvent mixtures (Volume ratio) | OCV (Volts) | initial c.d. ($\mu A/cm^2$) | terminal c.d. ($\mu A/cm^2$) | Delivered capacity to 1.5 V cut off (mAh) |
|---|---|---|---|---|---|
| 10. | Toluene:THF (1:1) | 2.28 | 150 | 10 | 450 |
| 11. | Toluene:THF (3:1) | 2.21 | 85 | 10 | 460 |
| 12. | Xylene:THF (2:1) | 2.23 | 85 | | 50* |
| 13. | Mesitylene:THF (2:1) | 2.20 | 40 | | 20* |
| 14. | Toluene:2M THF (1:1) | 2.26 | 150 | | 85* |
| 15. | Toluene:THF: Dioxolane (1:1:1) | 2.30 | 180 | | 60* |

*The cell is still running

EXAMPLE 18

(not part of this invention)

Four cells (A-D) similar to example 2 were assembled. The cathodes were Teflon-bonded carbon loaded with 2.1 Ahr (120 mAh/cm$^2$) solid sulfur. The electrolyte was 1.0 M LiBr dissolved in:
A—pure PC (propylene carbonate)
B—1:1 PC:THF
C—1:4 PC:THF
D—1:9 PC-THF The OCV of the cells was 2.63-2.65 volt and the total capacity to 1.5 volt cutoff 0.36, 0.42, 0.53 and 0.70 A.hr respectively.

We claim:

1. A primary cell comprising in combination:
   a. an anode consisting of lithium, sodium or a dischargeable alloy of same having a melting point above 80° C.
   b. an electrolyte comprising a solvent or mixture of solvents of suitable melting and boiling point adapted to dissolve a polysulfide at a concentration above 0.01 M and to dissolve an electrolyte salt to make a solution of at least 0.1 M, said solvent having an own EMF against the anode which is low enough so that it will not prevent the reaction of the anode material with said polysulfide to form a $M_2S$ solid electrolyte interphase, said electrolyte containing a polysulfide $M_2S_n$ where M is a metal selected from lithium and sodium, the concentration of the polysulfide being high enough and n being low enough to result in a predetermined low selfdischarge of the cell, and
   c. an inert porous cathodic current collector, which may be loaded with sulfur.

2. A cell according to claim 1, wherein the melting point of the solvent is below 0° C. and the boiling point is above 60° C.

3. A cell according to claim 1, wherein the solvent is selected from ethers or mixtures of ethers.

4. A cell according to claim 1, wherein the solvent mixture contains 10-90% by volume of a cosolvent which reduces the solubility of polysulfide, therefore decreasing the viscosity of the electrolyte and improving its conductivity, being compatible with the anode and polysulfide defined in claim 1(b).

5. A cell according to claim 4, wherein the cosolvent is an aromatic hydrocarbon or mixture of aromatic hydrocarbons.

6. A cell according to claim 5, wherein the aromatic hydrocarbon is alkyl benzene or polyalkyl benzene.

7. A cell according to claim 4, wherein the cosolvent is selected from the group consisting of toluene, benzene, xylene, mesitylene, ethylbenzene and ethylmethyl benzene.

8. A cell according to claim 1, containing an additional electrolyte which is a salt of a cation of the said anode or of an alkali metal selected from lithium and sodium, the anion being compatible with the anode and the polysulfide, which does not interfere with the formation of the $M_2S$ solid electrolyte interphase.

9. A cell according to claim 1, wherein the current collector comprises high surface area carbon or graphite bonded by an inert polymeric binder.

10. A cell according to claim 1, wherein the anode comprises a minor quantity of aluminum and/or magnesium and/or silicon and/or calcium and/or boron.

11. A cell according to claim 1, wherein the cell comprises a porous separator.

12. A cell according to claim 1, wherein the anode is made of essentially pure lithium.

13. A cell according to claim 8, wherein the additional electrolyte is lithium bromide, lithium iodide, or lithium perchlorate.

14. A cell according to claim 1, wherein the porous cathodic current collector is loaded with sulfur.

15. A cell according to claim 2, wherein the concentration of the polysulfide is larger than 0.5 M when n is smaller than 7.

16. A cell according to claim 1, wherein the concentration of the polysulfide is higher than 1.5 M when n is larger than 10.

17. A cell according to claim 1, wherein the solvent mixture is toluene and THF by volumetric ratio 4:1 to 1:3, the anode is pure lithium and the additional electrolyte is 0.5 to 1.5 M lithium perchlorate.

18. A cell according to claim 1, wherein the solvent mixture consists of toluene, dioxolane and THF, in a volumetric ratio of about 1:1:1, the additional electrolyte salt is 0.5 M to 1.0 M $LiClO_4$ and the anode is pure lithium.

19. A cell according to claim 14, wherein the polysulfide is formed inside the cell by self discharge (reaction of the anode with the sulfur dissolved in the electrolyte) and by predischarge of the cell.

* * * * *